United States Patent [19]

Muraki et al.

[11] 4,302,205
[45] Nov. 24, 1981

[54] INPUT CONTROL METHOD AND MEANS FOR NITROGEN OXIDE REMOVAL

[75] Inventors: Ryoji Muraki, Nishinomiya; Shinichiro Takemura, Osaka; Tetsuo Ai, Kamakura; Takaaki Kawasaki, Fuchu, all of Japan

[73] Assignees: Kurashiki Boseki Kabushiki Kaisha; Tokyo Shibaura Electric Co., Ltd., both of Japan

[21] Appl. No.: 128,125

[22] Filed: Mar. 7, 1980

Related U.S. Application Data

[63] Continuation of Ser. No. 873,057, Jan. 27, 1978, abandoned.

[30] Foreign Application Priority Data

Jan. 31, 1977 [JP] Japan .................................. 52-8711

[51] Int. Cl.³ .......................................... G05D 11/02
[52] U.S. Cl. .............................. 23/232 R; 23/230 A; 364/500; 422/62; 422/111; 423/239; 423/235
[58] Field of Search .................. 23/230 A, 232 R; 422/62, 83, 94, 111, 105; 364/105, 500; 423/239, 235

[56] References Cited

U.S. PATENT DOCUMENTS

| | | | |
|---|---|---|---|
| 3,656,911 | 4/1972 | Hobbs | 422/62 |
| 4,069,413 | 1/1978 | Rutledge et al. | 23/230 A |
| 4,094,959 | 6/1978 | Ball et al. | 23/230 A |
| 4,188,190 | 2/1980 | Muraki et al. | 364/500 X |

OTHER PUBLICATIONS

Savas, "Computer Control of Industrial Processes," McGraw-Hill, (1965), pp. 20-27, 52 and 53.

*Primary Examiner*—Ronald Serwin
*Attorney, Agent, or Firm*—Wenderoth, Lind & Ponack

[57] ABSTRACT

Nitrogen oxide contained in the flue-gas from a heating unit is removed in a nitrogen oxide removal unit by injection of nitrogen oxide removing agent in an amount determined by the amount of the nitrogen oxide contained in the flue-gas. Such amount of nitrogen oxide contained in the flue-gas is detected, on the one hand, by the estimation obtained through calculation using factors such as rate of supply of fuel to the heating unit and concentration of oxygen in the flue-gas, and on the other hand, by direct measurement, for a fail-safe system.

17 Claims, 5 Drawing Figures

INPUT CONTROL METHOD AND MEANS FOR NITROGEN OXIDE REMOVAL

This is a Continuation, of application Ser. No. 873,057, filed Jan. 27, 1978 and now abandoned.

The present invention relates to a method and means for control of input to means for removal of nitrogen oxides from flue-gas. More particularly, the invention relates to a method and means for nitrogen oxide removal with input control having means for estimating the amount of $NO_x$ contained in the flue-gas.

It is known that, although on a global basis man-made emission of nitrogen oxide, NO, and nitrogen oxides, represented by the formula $NO_x$, that is, composite atmospheric concentration of nitrogen monooxide, NO, and nitrogen dioxide, $NO_2$, is much less than that produced by natural sources, man-made $NO_x$ emission may result in high local concentration of $NO_x$, and that when present at certain levels of concentration in a given locality, $NO_x$ constitutes a pollutant which as such has an adverse effect on human health and which also contributes to formation of photochemical smog. Since such levels of $NO_x$ concentration are regularly achieved in certain areas, it is a desideratum, and in some areas a legal obligation, to effect reduction of concentrated local emission of nitrogen oxides. Principal sources of man-made $NO_x$ emission are motor vehicles and stationary combustion sources, such as boiler units for power stations, for example, whereat fuel combustion is effected, nitrogen oxides being produced as a result of oxidation of nitrogen released from the fuel during the combustion process.

In known methods, removal of $NO_x$ from flue-gas of a boiler or other heater is generally effected by injection of a reducing agent which reacts with the $NO_x$ to produce harmless substances. In the so-called dry process, for example, during transport of the flue-gas to a stack the flue-gas is passed through a cleaning unit wherein it is brought into contact with ammonia gas, $NH_3$, which is injected into the cleaning unit and, acting as reducing or removing agent, combines with the $NO_x$, mainly NO at this stage, to form $(N_2+H_2O)$. It is also known to convert nitrogen oxides in flue-gas by injection of other substances, for example carbon monoxide, CO, or carbon hydride HC.

Whatever substance is employed as $NO_x$ reducing agent, in order to know how much should be injected in order to achieve efficient conversion of $NO_x$, it is of course necessary to know how much $NO_x$ there is in the flue-gas. With respect to this point ammonia gas has an advantage over other substances employed in that efficient $NO_x$ conversion is effected when there is an equal number of moles of $NO_x$ and of $NH_3$, whereas the number of moles of other substances must be a multiple of the number of moles of $NO_x$. In other words, any error of determination of the amount of $NO_x$ is multiplied when the required amount of these other substances is calculated. In all cases, however, if the amount of $NO_x$ is not correctly determined, either an insufficient or an excessive amount of $NO_x$ reducing agent is injected. If an insufficient amount of $NO_x$ reducing agent, removal of $NO_x$ is not correctly effected. On the other hand, it is generally undesirable to inject too much $NO_x$ reducing agent. Ammonia gas, for example, can itself constitute a pollutant if released unconverted to the atmosphere.

Figure 1:
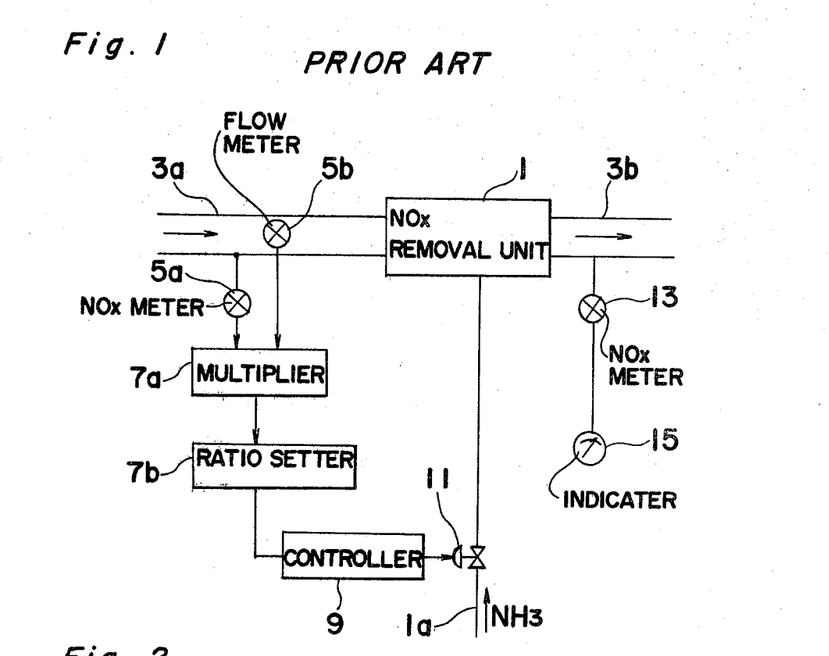
FIGS. 1 and 2 are drawings already referred to in the foregoing description, FIG. 1 being a schematic view of a conventional nitrogen oxide removal unit control means and FIG. 2 being schematic view of another conventional nitrogen oxide removal unit control means.

It is known conventionally to control input to a means for effecting removal of nitrogen oxides from flue-gas by means such as shown in FIG. 1 in which flue-gas being exhausted from a boiler unit or similar installation passes along an exhaust pipe $3a$, then through a nitrogen oxide removal unit 1, and then through an exhaust pipe $3b$ leading to a stack or other discharge means. Flue-gas passing through the removal unit 1 has injected thereinto a nitrogen oxide conversion or reducing agent for example ammonia gas, which is supplied to the removal unit 1 at a rate determined by the degree of opening of a control valve 11 provided on the ammonia gas supply line $1a$. The degree of opening of the control valve 11 is controlled by a controller 9 in response to output from a ratio setter $7b$. The ratio setter $7b$ receives input indicating multiplication results obtained by a multiplier $7a$, which multiplies the values of inpt supplied thereto by a $NO_x$ meter $5a$ and a flow meter $5b$ which respectively determine the concentration of nitrogen oxide and the rate of flow of flue-gas in the exhaust pipe $3a$, results obtained by the multiplication circuit $7a$ thus being indicative of the total amount of nitrogen oxide present in the exhaust pipe $3a$. At any rate given stage the ratio setter $7b$ calculates the amount of ammonia gas required to effect efficient conversion of the particular amount of nitrogen oxide present in the exhaust pipe $3a$ and also calculates the degree to which the control valve 11 is required to be opened in order to effect supply of this amount of ammonia gas, output from the ratio setter $7b$ being supplied to the controller 9 as noted above, and of course varying as the amount of nitrogen oxide in the exhaust pipe $3a$ varies. In such a means it is customary to provide on the exhaust pipe $3b$ a second nitrogen oxide concentration $NC_x$ meter 13 which supplies input to an indicator 15 and makes it possible for staff to determine whether or not the nitrogen oxide removal unit is functioning efficiently.

A major problem in such a control system is that of reliability, since metering elements normally having complicated structure are exposed highly corrosive and dirty conditions, and are therefore liable to function incorrectly after being in service for a certain time, even if the metering elements are completely packaged units. More important is the fact that since the calculated amount of nitrogen oxide is determined entirely on the basis of measurements made in one and the same portion of a heating installation, injection of correct amounts of nitrogen oxide reducing agent is entirely dependent on correct functioning of meters employed in this portion of the heating installation and there is no safeguard against or compensation for any malfunction of the meters.

Figure 2:
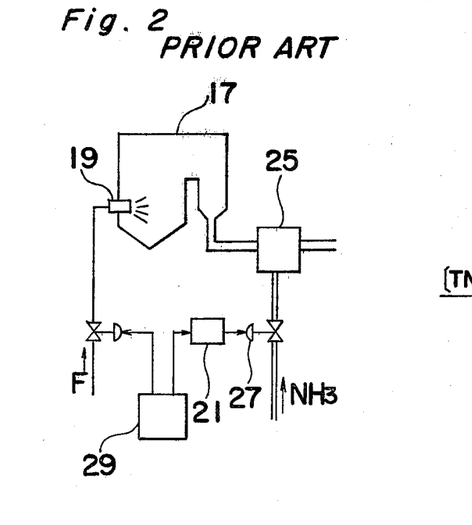

In another known method for controlling nitrogen oxide emission, problems of corrosion of metering equipment are largely avoided since there is employed as shown in FIG. 2 means which controls supply of fuel to the burner or burners 19 of a heating unit 17 and simultaneously controls the rate at which a nitrogen oxide reducing agent is injected into the $NO_x$ removal unit 25, the supply rate of this reducing agent being proportional to the fuel supply rate, and the control means 21 having associated therewith a suitable computing unit 29 for calculating the required amount of nitrogen oxide reducing agent and the required degree of opening of flow control means 27 to effect supply of the calculated amount. This method has the advantage that the control system as a whole has a simple configuration and is easy to install. The method, however, has the disadvantage that the calculated amount of nitrogen oxide is only approximate, since there is a variable time delay between production of nitrogen oxides at the vicinity of a burner and arrival of the nitrogen oxides at the location of a nitrogen oxide removal unit, i.e., at a particular moment it can by no means be guaranteed that nitrogen oxide concentration in a particular portion of flue-gas exhaust pipe is the same as that in the vicinity of the burners. Another reason for imprecision in the calculated amount of nitrogen oxide is that although nitrogen oxide production is indeed dependent on the rate at which fuel is consumed and theoretically can be calculated with reference to this one factor, it is also dependent on other factors, which in a practical heating installation are liable to vary, and it cannot be assumed that nitrogen oxide production is simply proportional to rate of fuel supply alone.

It is accordingly a primary object of the present invention to provide a method and means for control of a nitrogen oxide removal wherein the amount of required nitrogen oxide reducing agent is controlled by the amount of nitrogen oxide produced in the burner or boiler, whereby more accurate control of the nitrogen removal means is effected.

It is another object of the present invention to provide a method and means for control of a nitrogen oxide removal means of the above described type in which the amount of nitrogen oxide produced in the burner or boiler is detected either by the calculation or by the direct measurement thereof.

It is a further object of the present invention to provide a method and means for control of a nitrogen oxide removal means of the above described type in which the amount of required nitrogen oxide reducing agent can be obtained, even if the direct measurement of the nitrogen oxide is incorrect, by the calculated amount of nitrogen oxide produced in the burner.

It is a still further object of the present invention to provide a method and means for control of a nitrogen oxide removal means of the above described type in which the calculation for detecting the amount of nitrogen oxide produced in the burner is effected by the use of factors other than concentration of the nitrogen oxide.

It is yet a further object of the present invention to provide a method and means for control of a nitrogen oxide removal means of the above described type which is compact in size and can readily be installed.

In accomplishing these and other objects according to the invention, in the first step, the amount of nitrogen oxides, $NO_x$, present in flue-gas which has not yet passed through an $NO_x$ removal unit, is simultaneously determined in two ways, one way being direct measurement and the other way being to calculate $NO_x$ by means of a formula employing at least two factors relating to burning requirement and burning condition. Such factors may be selected from the factors of flow rate of fuel to the heating unit, concentration of oxygen in the flue-gas, concentration of carbon dioxide in the flue-gas, flow rate of air used in the combustion process effected in the heating unit and amount of flue-gas. These factors are weighted by empirically determined constants in a formula which gives values close to direct-measurement values.

It is to be noted that one of the two factors to be employed in the formula is preferably the factor of flow rate of fuel to the heating unit for simplifying the calculation and yet having the precision.

The direct measurement of amount of $NO_x$ produced in the flue-gas is effected by the product of the measurement of $NO_x$ concentration of the flue-gas before being supplied to the $NO_x$ removal unit and the amount of total flue-gas.

In the second step, the calculated value and direct-measurement value of $NO_x$ are compared with each other for detecting the difference therebetween. Such difference is integrated for a predetermined period of time for producing an average difference.

In the third step, the average difference is compared with a reference difference which gives a tolerance of the difference. When the average difference is within the tolerance, one of the calculated value and direct-measurement value is supplied to means for determining the amount of reducing agent to be supplied to the $NO_x$ removal unit, while on the other hand, when the average difference is beyond the tolerance, then, the means for measuring the $NO_x$ concentration is inspected whether it is out of order or not.

When the $NO_x$ concentration measuring means is determined as being in order, then, it is considered that the difference is most likely to be caused by the erroneous calculation, so that the formula is instantaneously corrected by the use of direct-measurement value of $NO_x$. Therefore, the means for determining the amount of reducing agent to be supplied to the $NO_x$ removal unit can be supplied with one of the calculated value being corrected and direct-measurement value.

On the other hand, when the $NO_x$ concentration measuring means is determined as being out of order, as is quite likely to happen due to the severity of ambient condition, then the values from the measuring means may be completely meaningless. In this case, the means for determining the amount of reducing agent is supplied only with the calculated value.

As is apparent from the foregoing description, either the calculated value or the measured value of the $NO_x$ can be selectively utilized for controlling the means for determining the amount of reducing agent. Furthermore, as long as the $NO_x$ concentration measuring means is functioning correctly, while the calculated value is corrected instantaneously, it is possible to use calculated value for controlling the means for determining the amount of reducing agent. In the latter case, the $NO_x$ concentration measuring means can be used, at times, for measuring the $NO_x$ concentration in the flue-gas before being supplied to the $NO_x$ removing unit, while at other times, can be used for watching the $NO_x$ concentration in the cleaned flue-gas exhausted from the $NO_x$ removal unit.

Since the amount of $NO_x$ produced in the flue-gas is known either by estimation through calculation or by direct measurement, it is possible to use either one of the amounts for controlling the supply of $NO_x$ reducing agent. When the amount of $NO_x$ produced in the flue-gas given by the direct-measurement should become erroneous, for example, by the breakdown of the $NO_x$ concentration measuring means, it is possible to have the amount of $NO_x$ produced in the flue-gas given by estimation through calculation to substitute such amount. On the other hand, when the amount of $NO_x$ produced in the flue-gas given by estimation through the calculation should become erroneous due to changes in the environmental conditions and other factors, the formula for such calculation is instantaneously corrected by the use of amount of direct-measurement of $NO_x$ concentration. Therefore, the $NO_x$ reducing agent can be controlled, at all times, by the employment of the amount of $NO_x$ produced in the flue-gas given by the estimation through calculation. Accordingly, more precise and reliable control in supplying the $NO_x$ reducing agent is achieved.

These and other objects and features of the present invention will become apparent from the following description taken in conjunction with preferred embodiments thereof with reference to the accompanying drawings, in which;

BRIEF DESCRIPTION OF THE DRAWINGS

Before the description of the present invention proceeds, it is to be noted that like parts are designated by like reference numerals throughout the accompanying drawings.

Figure 3:
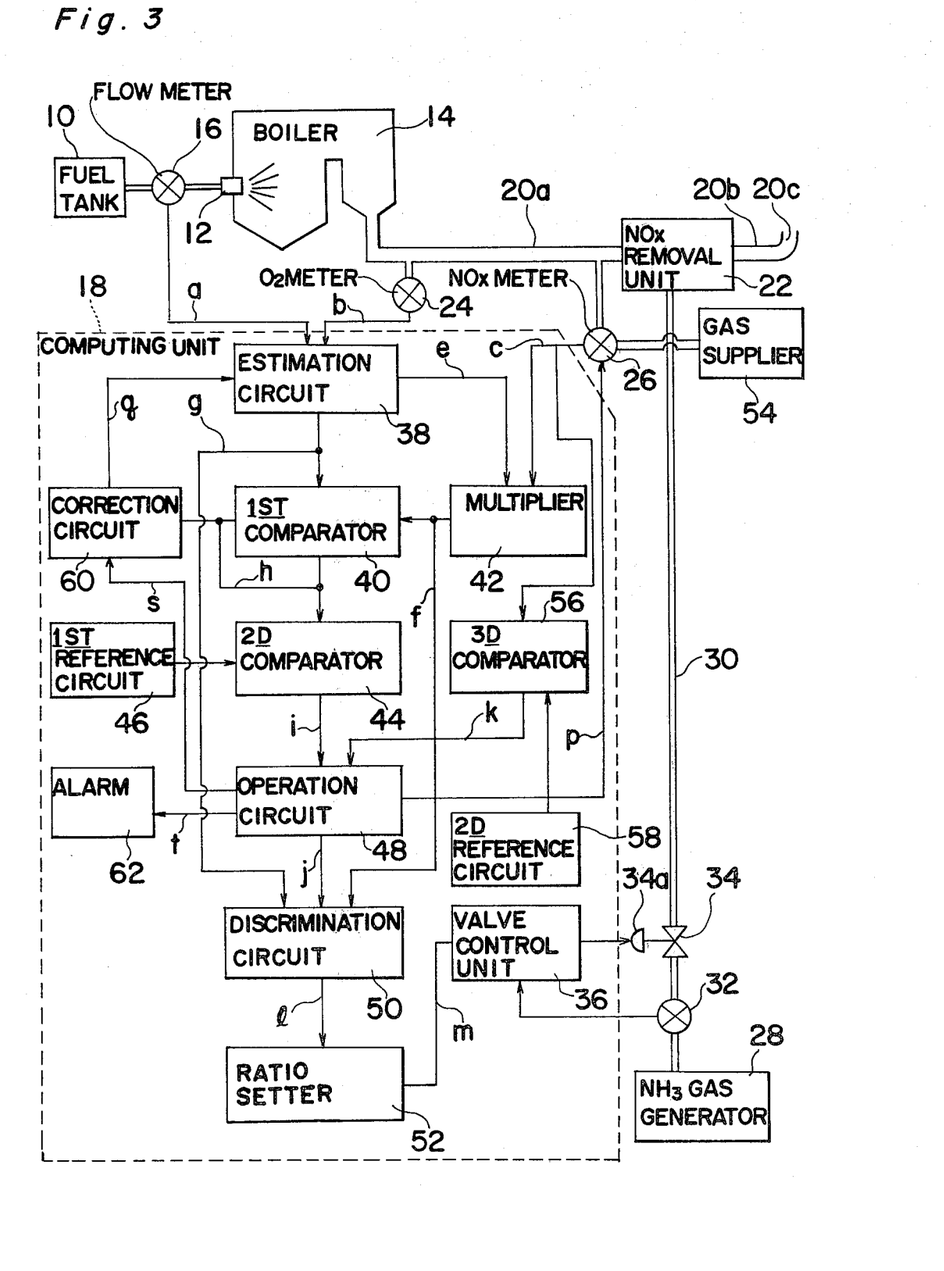
FIG. 3 is a block diagram of nitrogen oxide removal unit control means of the present invention.

Referring to FIG. 3, there is shown an input control circuit for nitrogen oxide removal unit according to one embodiment of the invention in which the rate at which fuel, e.g., heavy oil in a fuel tank 10, is supplied to one or more oil-fired burners 12 employed in a boiler unit 14 is measured by a flowmeter 16 of the turbine or similar known type. The register of the flowmeter 16 is provided with an electrical take-off by which signals indicative of the measurements made by the flowmeter 16 are supplied along a line a to a computing unit 18. The computing unit 18 is required to perform logic operations and the arithmetic operations of addition, subtraction, multiplication, etc., as described in further detail below, and is suitably presented in the form of a microcomputer. Flue-gas is exhausted from the boiler unit 14 via a discharge pipe 20a which leads to a nitrogen oxide removal unit 22. After passing through the nitrogen oxide removal unit 22, the flue-gas is led along a continuation exhaust pipe 20b through other known means (not shown), for the removal of other pollutants, the flue-gas being eventually led to a stack 20c. Needless to say, the flue-gas may be led through means for removal of particulates or other pollutants (not shown) prior to being brought to the nitrogen oxide removal unit 22.

On the discharge pipe 20a, there is provided an oxygen ($O_2$) meter or metering unit 24 and a nitrogen oxide ($NO_x$) meter 26, each including magnetic or other known types of gas analyzing elements and electrical take-off which produces continuous output or output pulses indicative of values relating to the respective gases. The electrical output signals from the $O_2$ metering unit 24 are supplied along signal line b to the computing unit 18.

A reducing agent, for example ammonia gas, $NH_3$, is injected into flue-gas passing through the nitrogen oxide removal unit 22, the ammonia gas being supplied from a reservoir or ammonia gas generator 28 indicated schematically in a lower portion of the drawing along a supply line 30 on which there is provided a flowmeter 32 provided with an electrical take-off and a flow control valve 34. The degree of opening of the flow control valve 34, and hence rate of supply of ammonia gas to the nitrogen oxide removal unit 22, is controlled by a controller or valve control unit 36 in response to input which is supplied from the computing unit 18 along a lead line m to the control unit 36, and also, in response to input supplied from the flowmeter 32 indicating current rate of supply of the ammonia gas. An electropneumatic actuator 34a or similar known means is coupled to the flow control valve 34 to open or close the flow control valve 34 in response to the control unit 36. It is to be noted that the input signal from the computing unit 18 is indicative of ratio in the amount of flue-gas to ammonia gas.

The computing unit 18 comprises an estimation circuit 38 which theoretically estimates, upon receipt of signals from the flow meter 16 and the $O_2$ meter 24, at one hand, the value of $NO_x$ gas produced in the flue-gas per unit time, and at the other hand, the value of total flue-gas produced per unit time. The calculation for the estimation of the former value, expressed as $TNO_xcal$ ($Nm^3/H$), is given by a following equation;

$$[TNO_xcal] = c(a_0 \cdot Lf^2 + a_1 \cdot Lf + a_2 \cdot Lf \cdot [O_2]) \tag{1}$$

in which $Lf$ is a burning efficiency of the boiler (L/Lmax), $[O_2]$ is a concentration of oxygen in the flue-gas (%), L is a flow rate of the fuel (liter/H), Lmax is a rated flow rate of the fuel, and $c, a_0, a_1, a_2$ are constants. On the other hand, the calculation for the estimation of the latter value, expressed as $Ad$ ($Nm^3/H$), is determined by a following equation:

$$Ad = 21/(21-[O_2]) \cdot 11.82 \cdot p \cdot C \cdot L \tag{2}$$

in which $p$ is a specific gravity of the fuel, C is the amount of carbon contained in the fuel, and 11.82 is a constant particularly given when the fuel is heavy oil. It is to be noted that the value of the total flue-gas produced per unit time, i.e., Ad value, may be obtained by directly measuring the produced flue-gas, instead of above described estimation.

The $NO_xcal$ value is applied to a first comparator 40 while the Ad value is applied via a signal line e to a multiplier 42. The multiplier 42 receives a signal indicative of concentration of the nitrogen oxide produced from the $NO_x$ meter 26, said signal being multiplied by the signal indicative of Ad value for calculating the measured value of nitrogen oxide produced in the flue-gas per unit time. The signal indicative of measured value of nitrogen oxide obtained from the multiplier 42 and the signal indicative of the estimated value of nitrogen oxide obtained from the estimation circuit 38 are compared with each other in the first comparator 40 to produce the difference or error between the two signals. The error signal is then integrated in the first comparator 40 for a predetermined period of time to obtain a mean value of the error. At the end of every predetermined period of time, the first comparator 40 produces a signal indicative of the mean value of the error, and at the beginning thereof, the first comparator 40 is reset to nil. Such an error may be expressed as an absolute error or a relative error, while the predetermined period of time can be selected within a time between 30 min. to 60 min. A main purpose of taking the mean value of the error is to eliminate the operation of correction in the constant given in an equation, which correction will be described later.

The signal indicative of the mean value of the error, produced from the first comparator 40 is applied to a second comparator 44 which determines whether or not the error signal received from the first comparator 40 is within or beyond a predetermined tolerance upon comparison between the mean value of the error and an externally set range obtained from a first reference circuit 46 which is coupled to the second comparator 44. The first reference circuit 46 has upper and lower limits of tolerance of the mean value of the error, in percentage. Such upper and lower limits of tolerance may be preferably set within ±5%.

When the signal indicative of the mean value of the error is determined as falling within the set range, the second comparator 44 produces an OFF signal towards an operation circuit 48 to indicate that the signal indicative of the estimation of produced amount of $NO_x$ and the signal indicative of the measured amount of $NO_x$ are both giving substantially true values.

On the other hand, when the signal indicative of the mean value of the error is determined as falling outside the set range, the second comparator 44 produces an ON signal towards the operation circuit 48 to indicate that either the signal indicative of the estimation of produced amount of $NO_x$ or the signal indicative of the measured amount of $NO_x$ is erroneous.

A discrimination circuit 50, connected to the operation circuit 48 is applied, at one hand, through a lead line g, with the signal indicative of the estimation of produced amount of $NO_x$ from the estimation circuit 38, and also with the signal indicative of the measured value of $NO_x$ from the multiplier 42, through a lead line f.

When the operation circuit 48 receives the OFF signal from the second comparator 44, it is suspected that the signal indicative of the estimation of produced amount of $NO_x$ and the signal indicative of the measured amount of $NO_x$ are both giving substantially the true value of produced $NO_x$. Therefore, the operation circuit 48 produces an OFF signal towards the descrimination circuit 50 for allowing either the signal indicative of the estimation of produced amount of $NO_x$ or the signal indicative of measured amount of $NO_x$ to pass through the descrimination circuit 50 towards a ratio determining circuit 52. According to the embodiment shown in FIG. 3, the signal indicative of the measured amount of $NO_x$ is passed through the discrimination circuit 50 upon receipt of OFF signal from the operation circuit 48.

The ratio setter 52 determines an optimum ratio of the amount of $NO_x$ to the ammonia gas, which ratio may be about 0.9–1.0, for the removal of $NO_x$ containing in the flue-gas, and multiplies the amount of $NO_x$ by the determined ratio to produce a set value of the ammonia gas. The thus set value of ammonia gas is supplied to the valve control unit 36 for adjusting the valve 34 and hence controlling the flow rate of ammonia gas in the manner described above.

When the operation circuit 48 received the ON signal from the second comparator 44, it is suspected that either the signal indicative of the estimation of produced amount of $NO_x$ or the signal indicative of the measured amount of $NO_x$ is erroneous. Therefore, the computing unit 18 of the present invention inspects whether the $NO_x$ meter 26 is operating in order or not, in a manner described hereinbelow.

Upon receipt of ON signal from the second comparator 44, the operation circuit 48 produces ON signal towards the $NO_x$ meter 26 for temporarily supplying a reference gas from a gas supplier 54 containing $NO_x$ gas in predetermined concentration. In response to the receipt of the reference gas from the gas supplier 54, the $NO_x$ meter 26 operates to produce a test signal in an expected value relating to the reference gas when the $NO_x$ meter 26 is in order. However, if the $NO_x$ meter 26 is out of order, then the test signal produced therefrom upon receipt of the reference gas would be different from the expected value.

A third comparator 56 is connected to the $NO_x$ meter 26 for comparing the test signal with a reference signal produced from a second reference circuit 58 coupled to the third comparator 56. When the test signal substantially matches with the reference signal, the third comparator 56 produces an OFF signal towards the operation circuit 48 through a lead line k to indicate that the $NO_x$ meter 26 is in order. Such OFF signal is further supplied through a lead line j to the discrimination circuit 50 for allowing the signal indicative of the measured amount of $NO_x$ concentration determined as to be giving true value of $NO_x$ concentration, to pass through the discrimination circuit 50. Upon receipt of the OFF signal from the third comparator 56, the operation circuit 48, at one hand, produces OFF signal towards the discrimination circuit 50 for allowing the signal indicative of the measured amount of $NO_x$, determined as giving the true value of $NO_x$, to pass through the discrimination circuit 50, and on the other hand, produces a correction signal through a lead line s towards a correction circuit 60. Upon receipt of correction signal, the correction circuit 60 receives the error signal from the first comparator 40, through a lead line h, for the correction of the constant value in the equation (1) which is utilized in the estimation circuit 38.

On the other hand, when the test signal produced from the $NO_x$ meter 26 is determined as being different from the expected value, the third comparator 56 produces an ON signal towards the operation circuit 48 through the lead line k to indicate that the $NO_x$ meter 26 is out of order. Upon receipt of ON signal from the third comparator 56, the operation circuit 48, at one hand, produces ON signal towards the discrimination circuit 50 for allowing the signal indicative of the estimation of produced amount of $No_x$ determined as to be giving the true value of $NO_x$, to pass through the discrimination circuit 50, and on the other hand, produces an alarm signal through a lead line t towards a suitable alarm means 62 connected to the operation circuit 48 to indicate that the $NO_x$ meter 26 is out of order.

Thus selected signal determined as to be giving the true value of $NO_x$ is applied to the ratio setter 52 in which the optimum ratio of flue-gas to the ammonia gas for the removal of $NO_x$ contained in the flue-gas is determined.

Figure 4:
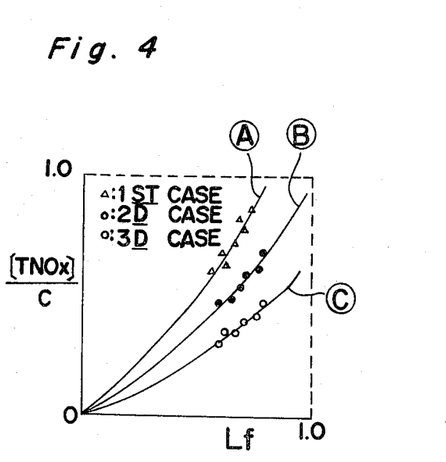
FIG. 4 is a graph showing relation between the burning efficiency of the boiler and the value of $NO_x$ produced in the flue-gas per unit time.

The description hereinbelow is directed to the correction of the constant value in the equation (1) on the basis of tests carried by the present inventors. Referring to the equation (1), it is found that the constants $a_0$, $a_1$ and $a_2$ are not completely independent of each other but are more or less relating to each other. However, it is also found that the constants $a_0$, $a_1$ and $a_2$ are mainly in relation to the fuel based on the condition of the boiler specification, fuel, and heat in the boiler, respectively. Upon arrangement of the constants $a_0$, $a_1$ and $a_2$ in values which satisfy an equation $(a_0 \cdot Lf^2 + a_1 \cdot Lf + a_2 \cdot Lf \cdot [O_2]) \approx 1.0$, provided that $Lf = 1.0$, the change in the value of $TNO_x cal$ in the equation (1) caused by the change in the specification of the boiler or other factors can be simply amended by the rearrangement of constant c. The graph shown in FIG. 4 shows the relation between the value of $NO_x$ contained in the flue-gas per unit time and the burning efficiency of the boiler in three different cases, in which graph abscissa and ordinate represent burning efficiency of the boiler $Lf$ and a value $TNO_x/c$ relating to the value of $NO_x$ produced in the flue-gas per unit time, respectively. Among three cases, the first case plotted by a mark $\Delta$ approximately falls on a curve indicated by a reference character A, while the second case plotted by a mark • approximately falls on a curve indicated by a reference character B, and the third case plotted by a mark o falls on a curve indicated by a reference character C. Each of the curves A, B and C can be approximately expressed in the following equations:

A $[TNO_x cal] = 7.893 \cdot$ $$(0.4826 \cdot Lf^2 + 0.4583 \cdot Lf + 0.6505 \cdot Lf \cdot [O_2]) \quad (3)$$

B $[TNO_x cal] = 7.893 \cdot$ $$(0.4826 \cdot Lf^2 + 0.3873 \cdot Lf + 0.06505 \cdot Lf \cdot [O_2]) \quad (4)$$

C $[TNO_x cal] = 7.893 \cdot$ $$(0.4826 \cdot Lf^2 + 0.3163 \cdot Lf + 0.06505 \cdot Lf \cdot [O_2]) \quad (5).$$

Supposing that the signal indicative of the measured amount of $NO_x$ which has been approximately equal to the signal indicative of the estimation of produced amount of $NO_x$ has changed its value in relation to the change in some factor or factors in the boiler, there will be produced the error signal from the first comparator 40 and in turn correction signal from the operation circuit 48 towards the correction circuit 60 for the correction of the constant value in the equation (1).

For example, on the assumption that the boiler is now in the condition of the second case described above in connection with FIG. 4, the signal indicative of the estimation of produced amount of $NO_x$ shows the value represented by the curve B, while the signal indicative of the measured amount of $NO_x$ shows the value represented by the plotted mark o. Thus, at this condition, the second comparator 44 determines that the error signal obtained from the first comparator 40 is within the tolerance. When the condition of the boiler is changer from the second case to the first case, then, the signal indicative of the measured amount of $NO_x$ changes its value from those represented by plotted mark o to plotted mark $\Delta$, although the signal indicative of the estimation of produced amount of $NO_x$ remains the same. Therefore, the error signal produced from the first comparator 40 falls outside the range of tolerance, and there will be produced correction signal from the operation circuit 48, provided that the $NO_x$ meter 26 is being operated in order. Here, it is to be noted that the error signal produced from the first comparator 40 is substantially in relation to the difference between the curve B representing the calculated value or estimated value ($TNO_x cal$) of the amount of $NO_x$ and the plotted mark $\Delta$ representing the measured value ($TNO_x mes$) of the amount of $NO_x$. Such difference at one particular moment can be expressed in the form of relative error as follows:

$$E = \frac{[TNO_x mes] - [TNO_x cal]}{[TNO_x cal]} \quad (6)$$

while the error signal produced from the first comparator 40 is substantially equal to the average of E being integrated during the predetermined period, which average is referred to as EAV hereinbelow.

According to the tests carried by the present inventors, the value of EAV for the above described exemplary case has resulted in the value of 0.071. Such value 0.071 is applied to the correction circuit 60, through the lead line h, for the change of constant $a_1$ from 0.3873 to 0.4583. Accordingly, the signal indicative of the estimation of produced amount of $NO_x$ produced from the estimation circuit 38 falls on the curve A. After such change in the constant $a_1$, the difference, expressed in the form of EAV, between the signal indicative of the estimation of produced amount of $NO_x$ and the signal indicative of the measured amount of $NO_x$ resulted in the value of 0.004 which is within the tolerance.

On the other hand, when the condition of the boiler is changed from the second case to the third case, then, the constant $a_1$ is automatically changed, in a similar manner described above, from 0.3873 to 0.3163 upon receipt of correction signal from the operation circuit 48 and also error signal from the first comparator 40 indicating the value of EVA is $-0.0071$ whereby the signal indicative of the estimation of produced amount of $NO_x$ produced from the estimation circuit 38 falls on the curve C. Accordingly, the difference, expressed in the form of EAV, between the signal indicative of the estimation of the amount of $NO_x$ produced and the signal indicative of the measured amount of $NO_x$ results, according to the tests, in the value of 0.0038, which is within the tolerance.

As is apparent from the foregoing description, the control circuit of the present invention can correct the equation for the estimation of the amount of $NO_x$ produced by the change of only one constant $a_1$, while other constants $a_0$ and $a_2$ remain the same. It is to be noted that the corrected value of $a_1$ can be obtained by a following equation:

$$\text{corrected } a_1 = a_1 \left( 1 + EAV \cdot \frac{a_0 + a_1 + a_2 \cdot \alpha}{a_1} \right) \quad (7)$$

provided that $\alpha$ is equal to $[O_2]$, that is, the concentration of oxygen in the flue-gas in percentage, when $Lf = 1$.

Figure 5:
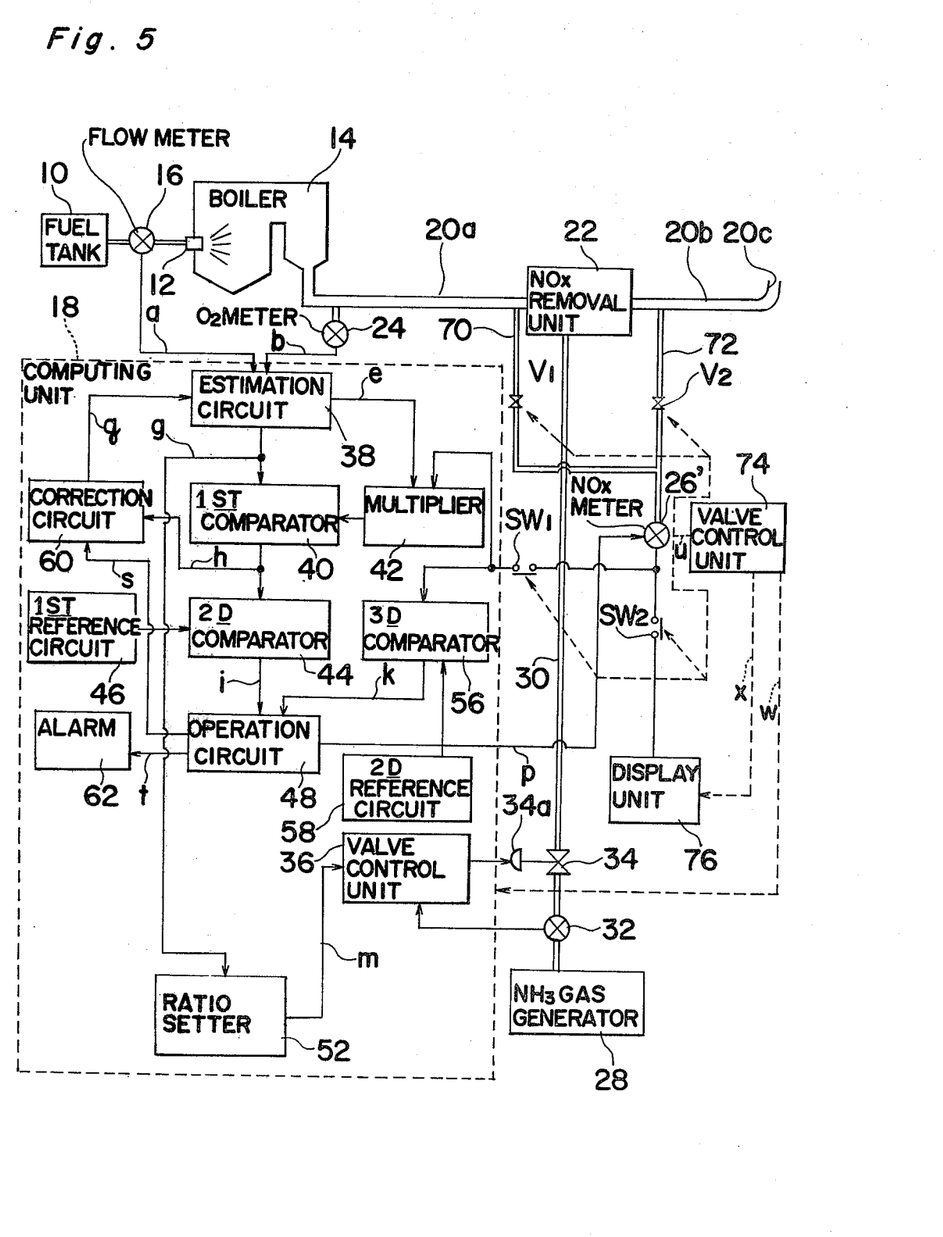
FIG. 5 is a similar view to FIG. 3, but particularly showing modification thereof.

Referring to FIG. 5, there is shown another embodiment of control circuit of the present invention. The two main differences in construction between the first and the second embodiments are, firstly, that the second embodiment has a $NO_x$ meter 26' so designed as to measure the $NO_x$ concentration at the discharge pipe 20a and also at the exhaust pipe 20b, and secondly, that the ratio determining circuit 52 receives the control signal only from the estimation circuit 38 instead of the discrimination circuit 50.

In order to have the $NO_x$ meter 26' measure the $NO_x$ concentration at the discharge pipe 20a and at the exhaust pipe 20b, the $NO_x$ meter 26' is connected, at one hand, to the discharge pipe 20a through a duct 70 having a valve $V_1$, and on the other hand, to the exhaust pipe 20b through a duct 72 having a valve $V_2$. Each of the valves $V_1$ and $V_2$ are so operated as to change its condition between the open condition and close condition, respectively, by a signal obtained from a valve control circuit 74. The signal obtained from the $NO_x$ meter 26' is applied, at one hand, to the multiplier 32 through a switch $SW_1$, and on the other hand, to a display unit 76 through a switch $SW_2$. Each of the switches $SW_1$ and $SW_2$ are so arranged as to change its condition between the ON condition and the OFF condition, respectively, by the signal obtained from the valve control circuit 74.

When the valve control circuit 74 produces first type signal, such as ON signal, the valves $V_1$ and $V_2$ are turned to open and close conditions, respectively, while the switches $SW_1$ and $SW_2$ are turned to ON and OFF conditions, respectively. In other words, the first type signal from the valve control circuit 74 controls to have the $NO_x$ meter 26' measure the $NO_x$ concentration in the discharge pipe 20a and apply the signal indicative of measured amount towards the multiplier 42, in the same manner described above.

When the valve control circuit 74 produces second type signal, such as OFF signal, the valves $V_1$ and $V_2$ are turned to close and open conditions, respectively, while the switches $SW_1$ and $SW_2$ are turned to OFF and ON conditions, respectively. In other words, the second type signal from the valve control circuit 74 controls to have the $NO_x$ meter 26' measure the $NO_x$ concentration in the exhaust pipe 20b and apply the signal indicative of measured amount of $NO_x$ concentration towards the display unit 76. The display unit 76 visually displays the concentration of the $NO_x$ in the exhaust pipe 20b.

The valve control circuit 74 has timer means (not shown) employed therein for maintaining ON signal therefrom for about 30 to 60 minutes for each measuring of the $NO_x$ concentration in the discharge pipe 20a, while such measuring may be carrier out about five times a day. During the measurement of the $NO_x$ concentration in the discharge pipe 20a, the valve control circuit 74 produces maintaining signal towards the display unit 76 through a lead line x for maintaining the $NO_x$ concentration previously measured and for indicating that the $NO_x$ meter 26' is now being used for measuring the $NO_x$ concentration in the discharge pipe 20a, while at the same time, the valve control circuit 74 produces "power on" signal through a lead line w for energizing the computing unit 18 enclosed in the dotted line.

According to the second embodiment as described above, the $NO_x$ meter 26'a serves, at one hand, for controlling the $NO_x$ contained in the discharge pipe 20a, while on the other hand, serves for watiching the $NO_x$ concentration in the exhaust pipe 20b. Therefore, the space necessary for the control circuit as well as the cost for manufacturing the same is reduced.

It is to be noted that various circuit elements such as operational amplifiers to be contained in the control circuit of the present invention can be coupled to a microcomputer having programmable memory device.

Although the present invention has been fully described by way of examples, it is to be noted that various changes and modifications are apparent to those skilled in the art. For example, as for detecting the burning condition in the boiler, it is possible to detect the carbon oxide gas in the flue-gas, or amount of air supplied to the boiler, or amount of flue-gas produced from the boiler, instead of flow rate of fuel or concentration of oxygen in flue gas, since there is such a close relation among these factors that the amount of any one of the factors can be obtained through theoretical calculation using the amount of other factors while the signals indicating such factors can be expressed in a similar manner. Therefore, these changes and modifications are to be understood as included within the true scope of the present invention unless they depart therefrom.

What is claimed:

1. In a method for removing nitrogen oxide ($NO_x$) from flue-gas produced by a burner unit which is supplied with fuel, by an injection of $NO_x$ removing agent into said $NO_x$ removing means in an amount which is related to the amount of $NO_x$ included in said flue-gas, wherein said amount of $NO_x$ removing agent is controlled by a method comprising the steps of:
    (a) detecting at least two factors relating to burning requirements and burning conditions by respectively detecting means for producing signals indicative of said respective factors, said two factors being selected from flow rate of fuel to the burner unit, concentration of oxygen in the flue-gas, concentration of carbon dioxide in the flue-gas, flow rate of air used in the combustion process effected in the burner unit, and the amount of flue-gas;
    (b) calculating the amount of $NO_x$ contained in said flue-gas directed to said $NO_x$ removing means during a predetermined period of time by the application of said factors in a formula memorized in a computing means, said formula being changeable with respect to at least one of its constants;
    (c) measuring the amount of $NO_x$ contained in said flue-gas directed to said $NO_x$ removing means during said predetermined period of time by an $NO_x$ measuring means;
    (d) comparing the calculated amount of $NO_x$ with the measured amount of $NO_x$ by a first comparing means for evaluating the difference therebetween and
    (e) comparing the difference of step (d) with a predetermined range of tolerance for said difference by a second comparing means for producing a first signal when said difference is within the predetermined range and a second signal when said difference is outside said predetermined range;
    the improvement wherein the following steps are performed subsequent to step (e)
    (f) upon receipt of said second signal from said second comparing means, determining whether or not the $NO_x$ measuring means is in order by an inspection means for producing third signal when said $NO_x$ measuring means is in order and fourth signal when said $NO_x$ measuring means is out of order;
    (g) changing the factor of said formula of (b) in the computing means, upon receipt of said third signal from the inspection means for satisfying the formula to cause the calculated amount of $NO_x$ to be substantially equal to the measured amount of $NO_x$; and
    (h) controlling the amount of $NO_x$ removing agent to be injected into said $NO_x$ removing means in an amount in relation to the amount of $NO_x$ by controlling means, said controlling means using either the calculated amount of $NO_x$ or measured amount of $NO_x$ when either the first or third signals is applied thereto, and using the calculated amount of $NO_x$ when the fourth signal is applied thereto.

2. A method for removing $NO_x$ as claimed in claim 1, wherein the calculated amount of $NO_x$ and measured amount of $NO_x$ are presented in a form of an average value taken after said predetermined period.

3. A method for removing $NO_x$ as claimed in claim 1, wherein said controlling means uses the measured amount of $NO_x$ when either the first and third signals is applied thereto, and uses the calculated amount of $NO_x$ when said fourth signal is applied thereto.

4. A method for removing $NO_x$ as claimed in claim 1, wherein said controlling means uses the calculated amount of $NO_x$ when either the first, third or fourth signal is applied thereto.

5. A method for removing $NO_x$ as claimed in claim 1, wherein said two factors are flow rate of fuel to the burner unit and concentration of oxygen in the flue-gas.

6. A method for removing $NO_x$ as claimed in claim 5, wherein the formula for calculating the $NO_x$ amount is represented as follows;

$$[TNO_xcal] = c(a_0 \cdot Lf^2 + a_1 \cdot Lf + a_2 \cdot Lf \cdot [O_2])$$

in which Lf is a burning efficiency of the burner unit (L/Lmax), $[O_2]$ is a concentration of oxygen in the flue-gas (%), L is a flow rate of the fuel (liter/H), Lmax is a rated flow rate of the fuel, and c, $a_0$, $a_1$, $a_2$ are constants.

7. In an apparatus having means for removing nitrogen oxide ($NO_x$) from flue-gas produced by a burner unit which is supplied with fuel, by an injection of $NO_x$ removing agent into said $NO_x$ removing means in an amount which is related to an amount of $NO_x$ included in said flue-gas, the improvment wherein there is provided means for controlling said amount of $NO_x$ removing agent comprising:
  (a) at least two detecting means for detecting at least two factors relating to burning requirements and burning conditions, respectively, and for producing signals from each of the detecting means indicative of respective detected factor; said two factors being selected from flow rate of fuel to the burner unit, concentration of oxygen in the flue-gas, concentration of carbon dioxide in the flue-gas, flow rate of air used in the combustion process effected in the burner unit, and the amount of flue-gas;
  (b) computing means connected to said two detecting means, said computing means memorizing a formula for calculating the amount of $NO_x$ contained in said flue-gas directed to said $NO_x$ removing means during a predetermined period of time by the application of said factors in said formula;
  (c) constant setting means connected to said computing means for setting at least one constant in said formula of (b) in the computing means;
  (d) $NO_x$ measuring means for measuring the amount of $NO_x$ containing in said flue-gas directed to said $NO_x$ removing means during said predetermined period of time;
  (e) first comparing means connected to said computing means and $NO_x$ measuring means for comparing the calculated amount of $NO_x$ with the measured amount of $NO_x$ and for evaluating the difference therebetween;
  (f) reference producing means for producing a reference signal indicative of upper and lower limits of a predetermined range of tolerance of said difference in (e);
  (g) second comparing means connected to said first comparing means and reference producing means for comparing the difference with the reference signal and for producing a first signal when said difference is within the predetermined range and second signal when the difference is outside the predetermined range;
  (h) means connected to said second comparing means and said $NO_x$ measuring means for determining, upon receipt of said second signal, whether or not the $NO_x$ measuring means is in order, and for producing third signal when said $NO_x$ measuring means is in order, and fourth signal when said $NO_x$ measuring means is out of order, and for supplying said third signal to said constant setting means for resetting said one constant in said computing means in reference to the difference produced by the first comparing means in step (e) and
  (k) controlling means for controlling the amount of $NO_x$ removing agent to be injected into said $NO_x$ removing means in an amount in relation to the amount of $NO_x$, said controlling means using either the calculated amount of $NO_x$ or measured amount of $NO_x$ when one of the first and third signals is applied thereto, and using the calculated amount of $NO_x$ when the fourth signal is applied thereto.

8. Apparatus for removal of $NO_x$ as claimed in claim 7 further comprising selecting means connected to said second comparing means, inspection means, computing means, $NO_x$ measuring means and controlling means for selecting, upon receipt of one of said first and third signals, either the calculated amount of $NO_x$ or measured amount of $NO_x$ to be supplied to said controlling means, and for selecting, upon receipt of said fourth signal, said calculated amount of $NO_x$.

9. Apparatus for removal of $NO_x$ as claimed in claim 8, wherein said selecting means selects a calculated amount of $NO_x$ for being supplied to said controlling means.

10. Apparatus for removal of $NO_x$ as claimed in claim 9, wherein said selecting means selects a measured amount of $NO_x$ for supply to said controlling means.

11. Apparatus for removal of $NO_x$ as claimed in claim 7, wherein said $NO_x$ measuring means comprises means for detecting $NO_x$ concentration in said flue-gas and means for detecting an amount of flue-gas, whereby the amount of $NO_x$ contained in the flue-gas is substantially equal to the product of $NO_x$ concentration and amount of the flue-gas.

12. Apparatus for removal of $NO_x$ as claimed in claim 11, wherein the formula for calculating the $NO_x$ amount is represented as follows:

$$[TNO_xcal] = c(a_0 \cdot LF^2 + a_1 \cdot Lf + a_2 \cdot Lf \cdot [O_2])$$

in which Lf is a burning efficiency of the burner unit (L/Lmax), $[O_2]$ is a concentration of oxygen in the flue-gas (%), L is a flow rate of the fuel (liter/H), Lmax is a rated flow rate of the fuel, and c, $a_0$, $a_1$, $a_2$ are constants.

13. Apparatus for removal of $NO_x$ as claimed in claim 12, wherein said means for detecting the amount of flue-gas is a calculation circuit calculating the amount of the flue-gas by a formula represented as follows;

$$[Ad] = 21/(21 - [O_2]) \cdot 11.82 \rho CL$$

in which $\rho$ is a specific gravity of the fuel, C is a rate of carbon containing in the fuel, and 11.82 is a constant particularly given when the fuel is heavy oil.

14. Apparatus for removal of $NO_x$ as claimed in claim 7, wherein said two factors are flow rate of fuel to the burner unit and concentration of oxygen in the flue-gas.

15. Apparatus for removal of $NO_x$ as claimed in claim 7, wherein said controlling means comprises determining means for determining an optimum ratio of amout of $NO_x$ to amount of $NO_x$ removing agent.

16. Apparatus for removal of $NO_x$ as claimed in claim 11, wherein said means for detecting $NO_x$ concentration is further connected to said $NO_x$ removing means at outlet portion thereof for measuring the concentration of $NO_x$ contained in said flue-gas exhausted from said $NO_x$ removing means when said means for detecting $NO_x$ concentration is not being used for measuring the amount of $NO_x$ containing in said flue-gas directed to said $NO_x$ removing means.

17. Apparatus for removal of $NO_x$ as claimed in claim 7 further comprising alarm means for producing alarm, upon receipt of said fourth signal.

* * * * *